(12) United States Patent
Li

(10) Patent No.: US 12,229,346 B1
(45) Date of Patent: Feb. 18, 2025

(54) MULTI-FUNCTIONAL KEY MODULE

(71) Applicant: Wenjie Li, Guangzhou (CN)

(72) Inventor: Wenjie Li, Guangzhou (CN)

( * ) Notice: Subject to any disclaimer, the term of this patent is extended or adjusted under 35 U.S.C. 154(b) by 0 days.

(21) Appl. No.: 18/465,478

(22) Filed: Sep. 12, 2023

(30) Foreign Application Priority Data

Aug. 15, 2023 (CN) .......................... 202311031479.0

(51) Int. Cl.
*G06F 3/02* (2006.01)
*G06F 1/16* (2006.01)

(52) U.S. Cl.
CPC .......... *G06F 3/0219* (2013.01); *G06F 1/1671* (2013.01)

(58) Field of Classification Search
CPC ...... G06F 3/041–047; G06F 2203/041–04114; H01H 19/14; H01H 2231/012; H01H 19/28; H01H 25/06; H01H 19/04; H01H 13/14; H01H 71/56; H01H 11/00
See application file for complete search history.

(56) References Cited

U.S. PATENT DOCUMENTS

| | | | | |
|---|---|---|---|---|
| 2006/0100059 | A1* | 5/2006 | Nonaka | G05G 1/087 477/121 |
| 2013/0163226 | A1* | 6/2013 | Chen | B60K 35/00 362/85 |
| 2017/0255266 | A1* | 9/2017 | Holenarsipur | G06F 3/016 |

FOREIGN PATENT DOCUMENTS

| | | | | |
|---|---|---|---|---|
| CN | 107887217 A | * | 4/2018 | ........... H01H 19/065 |
| JP | H11121209 A | * | 4/1999 | |

OTHER PUBLICATIONS

CN-107887217-A (Year: 2018).*
JP-H11121209-A (Year: 1999).*

* cited by examiner

*Primary Examiner* — Sanjiv D. Patel
(74) *Attorney, Agent, or Firm* — Westbridge IP LLC

(57) ABSTRACT

A multi-functional key module, configured to be installed in an electrical appliance, includes a hollow main housing, a pin, an electronic key, and an optical tracking chip, a contact trigger end of the electronic key is arranged towards the pin, and the electronic key gives an electrical signal when triggered by contact. The optical tracking chip emits a detection laser to the side surface of the pin and receives reflected light, and determines a motion state of the pin to generate an electrical signal; and the electronic key and the optical tracking chip are electrically connected. In the application, corresponding electrical signals are generated by pressing the key cap to trigger the electronic key, rotating the key cap, or pressing the key cap without causing the pin to trigger the electronic key, so that the composite control effect of a single key is achieved.

9 Claims, 3 Drawing Sheets

MULTI-FUNCTIONAL KEY MODULE

CROSS-REFERENCE TO RELATED APPLICATIONS

This application claims priority to Chinese Patent Application No. 202311031479.0, filed on Aug. 15, 2023, the content of which is incorporated herein by reference in its entirety.

TECHNICAL FIELD

The application relates to the technical field of switches, and in particular to a multi-functional key module.

BACKGROUND

Key switches are commonly used in various electrical appliances, in order to achieve the composite control function of a single key switch, some key switches in the related art give different control signals according to the press stroke while being pressed and triggered to give the control signals, and even give the control signals in the rotation of keys. For example, Chinese Patent Publication CN104534295B discloses an electric torch capable of dimming conveniently and rapidly. A spring is arranged inside a mounting groove between a button and a torch body to achieve button reset. A rotating handle is rotationally connected below the button, the rotating handle is connected to a rotating piece, a first switch is triggered by rotation, and the rotating handle is pressed to a limit position to trigger a second switch. The button not only has the ordinary press control function, but also achieves the rotation control function. However, in this method of connecting the rotating handle to the rotating piece to trigger the first switch to achieve rotation control, and other common methods of achieving rotation control using encoders or potentiometers in the related art, modules involved have a relatively large size or require more components, which is not conducive to the miniaturization of the key switches.

SUMMARY

The application provides a multi-functional key module to solve the problem in the related art that a key switch for achieving the composite control function requires large-sized functional modules or more components, which is not conducive to the miniaturization of the key switch.

In order to achieve the above objective, the application adopts the following technical solution.

A multi-functional key module, configured to be installed in an electrical appliance, includes a hollow main housing, a pin that passes through an upper end of the main housing from the inside of the main housing upwards, an electronic key fixedly installed at the bottom of the inside of the main housing, and an optical tracking chip arranged inside the main housing and towards a side surface of the pin.

An upper end of the pin is fixedly connected to a key cap.

A contact trigger end of the electronic key is arranged towards the pin, and the electronic key gives an electrical signal when triggered by contact.

The optical tracking chip emits a detection laser to the side surface of the pin and receives reflected light from the side surface of the pin, and the optical tracking chip determines a motion state of the pin according to the reflected light and generates an electrical signal.

The electronic key and the optical tracking chip are electrically connected.

Further, a lower end of the pin has a pin seat that prevents the pin from being completely pulled out from the upper end of the main housing.

Further, a waterproof ring cover covers an upper part of the main housing, a first waterproof ring is arranged between the waterproof ring cover and the upper part of the main housing, and the pin passes through the waterproof ring cover and the first waterproof ring and is connected to the key cap.

The first waterproof ring has elasticity, with an inner side tightly attached to the pin and an outer side tightly attached to the main housing and/or the waterproof ring cover.

Further, a Printed Circuit Board (PCB) is vertically arranged inside the main housing, and the PCB is located between an inner side wall of the main housing and the pin.

The optical tracking chip is arranged on the PCB.

Both the optical tracking chip and the electronic key are powered by the PCB, and both the optical tracking chip and the electronic key transmit electrical signals with the PCB.

Further, the multi-functional key module further includes a lower housing cover. A lower end of the main housing is connected to the lower housing cover to achieve closure.

The electronic key is installed on the lower housing cover.

Further, a gap at a connection between the main housing and the lower housing cover is filled with waterproof glue.

Further, the main housing and the lower housing cover are both made of plastic.

The main housing and the lower housing cover are connected by ultrasonic welding.

Further, a lower end of the PCB passes through the lower housing cover downwards, contacts are arranged on the part where the lower end of the PCB passes through the lower housing cover downwards, and the contacts are configured to connect external power supply elements.

Further, a contact gap between the PCB and the lower housing cover is filled with the waterproof glue.

Further, a spring is fixedly connected between the upper end of the main housing and a lower end of the key cap.

The application has the following beneficial effects.

The multi-functional key module of the application generates corresponding electrical signals by pressing the key cap to the pin to trigger the electronic key, rotating the key cap, or simply pressing the key cap without causing the pin to trigger the electronic key, so that the composite control effect of a single key is achieved.

The action of the pin in the application is captured only by the electronic key and the optical tracking chip, both of which have smaller sizes and fewer module components, so that the module of the application can be miniaturized.

DETAILED DESCRIPTION OF THE EMBODIMENTS

In order to make the purposes, technical solutions and advantages of the embodiments of the application clearer, the technical solutions of the application will be further clearly and completely described below in combination with the embodiments of the application. It is to be noted that the described embodiments are a part of the embodiments of the application, and not all of them. All other embodiments obtained by those of ordinary skill in the art based on the embodiments of the application without creative efforts are within the scope of the application.

It is to be noted that if directional indications (such as upper, down, left, right, front, rear, top, bottom, inside, outside, vertical, horizontal, longitudinal, counterclockwise, clockwise, circumferential, radial, axial, etc.) are involved in the embodiments of the application, the directional indications are only used to explain the relative positional relationships, movement, etc. between various parts under a specific attitude (as shown in the accompanying drawings). If the specific attitude changes, the directional indications are changed accordingly.

The term "and/or" in the embodiments of the application is only an association relationship describing associated objects, and represents that three relationships may exist. For example, A and/or B may represent three conditions: i.e., existence of only A, existence of both A and B, and existence of only B.

The terms "first" and "second" are used for descriptive purposes only, and cannot be understood as indicating or implying relative importance or implicitly indicating the number of indicated technical features. Therefore, the features defined with "first" and "second" may explicitly or implicitly include at least one of the features. In the description of the application, terms "include" and "have" and any variations thereof are intended to cover non-exclusive inclusions. For example, a system, product, or device including a series of parts or units is not limited to the parts or units which have been listed but optionally further includes parts or units which are not listed or optionally further includes other parts or units intrinsic to the product, or the device. In the description of the application, "plurality" means at least two, such as two, three, etc. unless otherwise specified and defined.

"Embodiment" mentioned herein means that a specific feature, structure, or characteristic described in combination with an embodiment may be included in at least one embodiment of the application. The phrase appearing anywhere in the specification does not always refer to the same embodiment or an independent or alternative embodiment mutually exclusive of another embodiment. It is explicitly and implicitly understood by those skilled in the art that the embodiments described herein may be combined with other embodiments.

Figure 1:
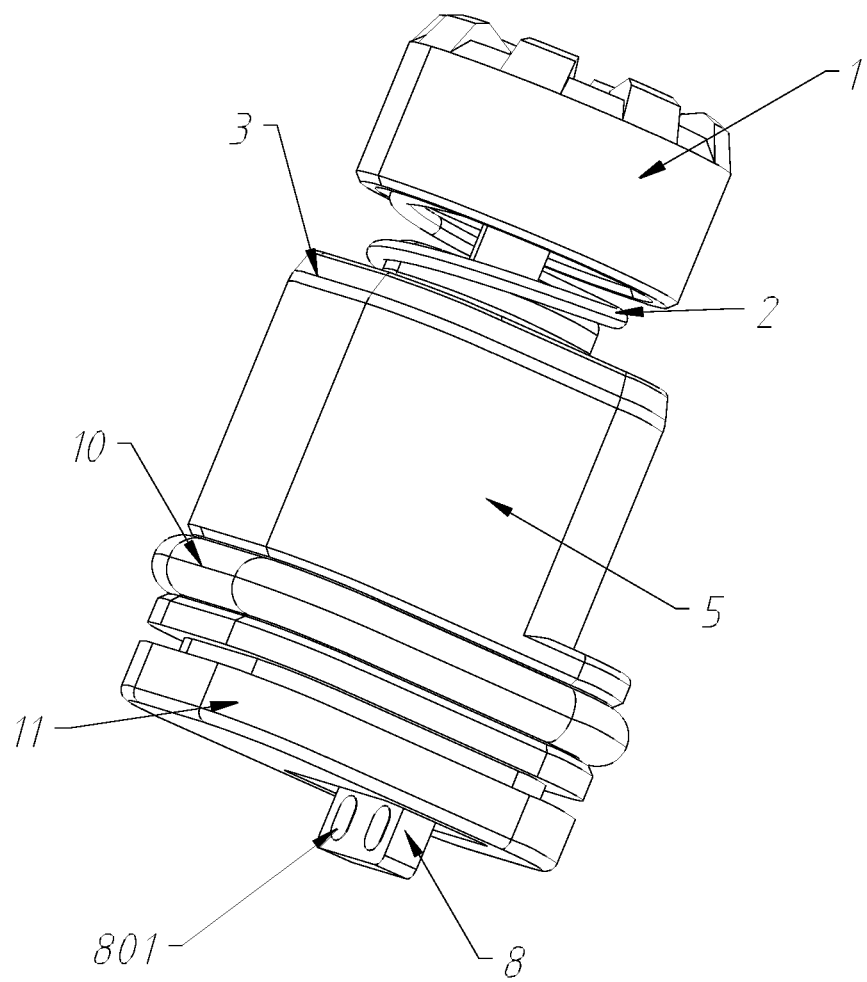
FIG. 1 is a stereogram of a multi-functional key module according to an embodiment of the present application.
Figure 2:
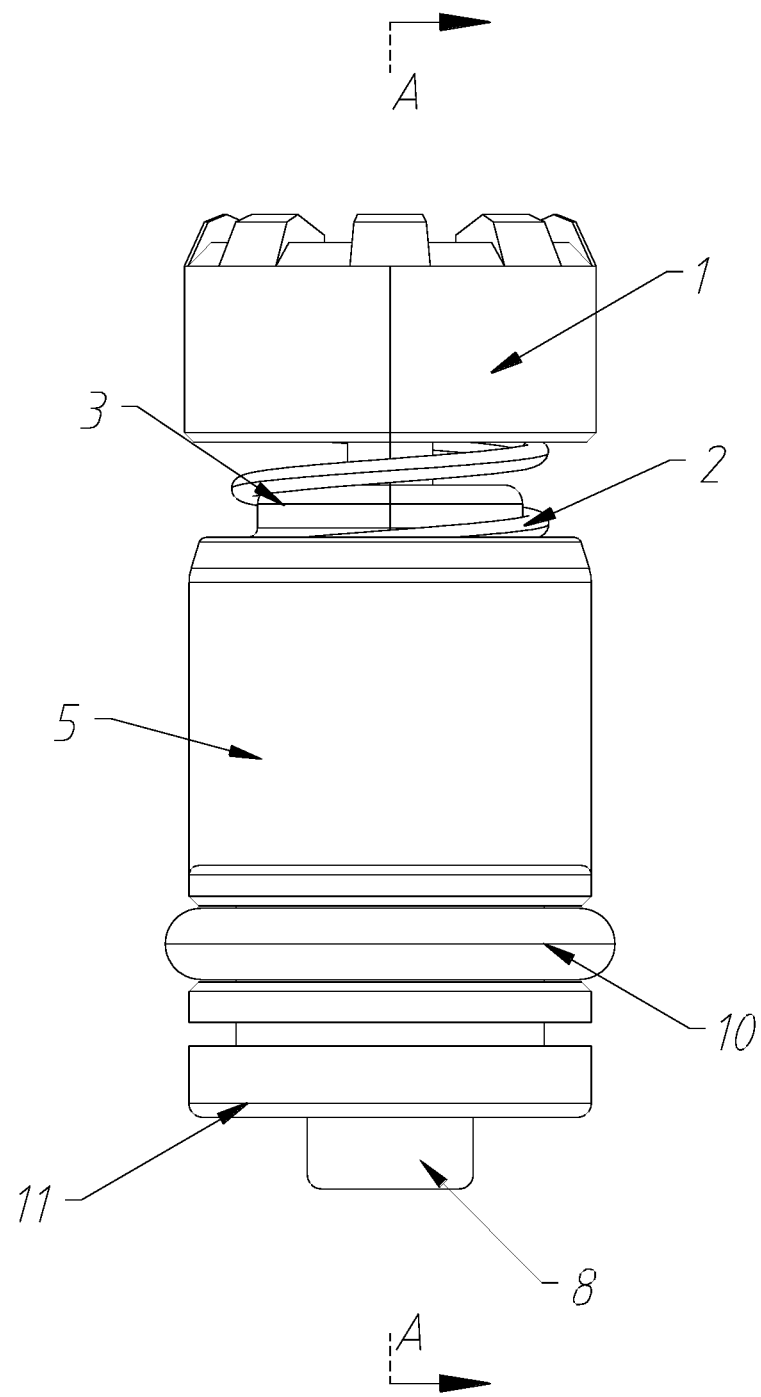
FIG. 2 is a front view of a multi-functional key module according to an embodiment of the present application.
Figure 3:
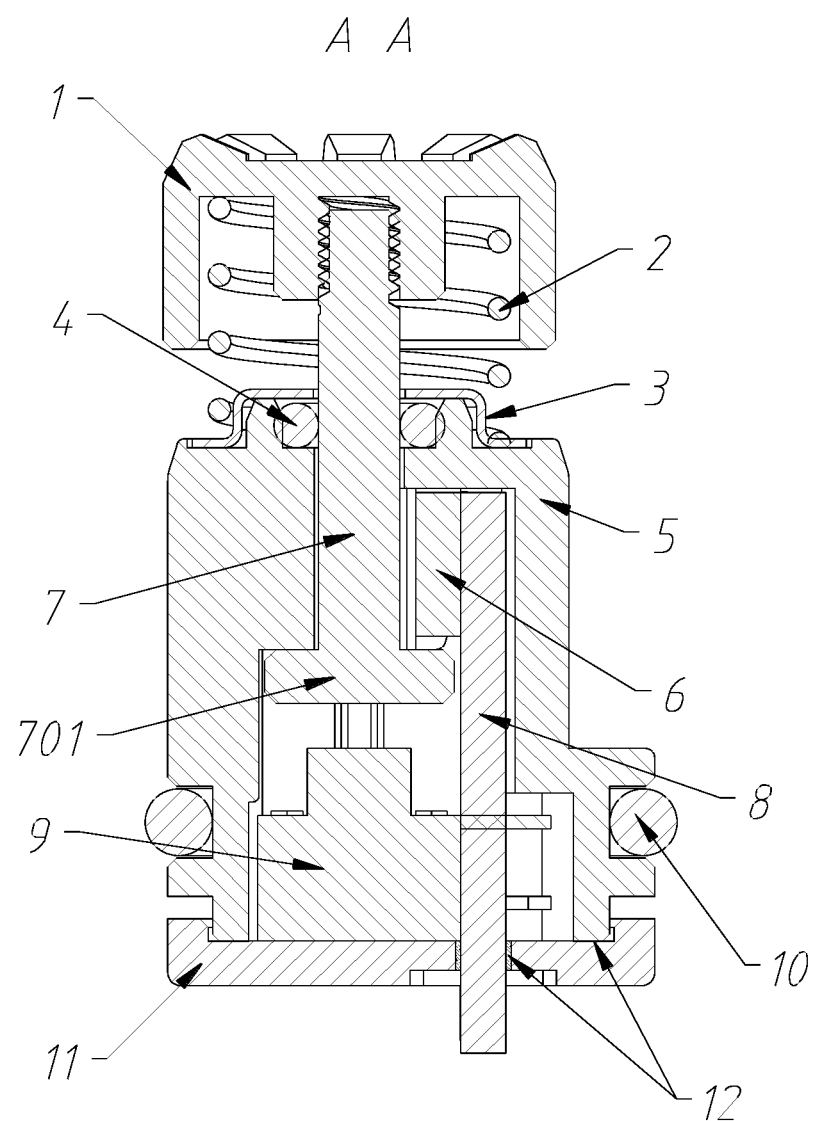
FIG. 3 is an A-A section view of FIG. 2 according to an embodiment of the present application.

The application provides a multi-functional key module, as shown in FIG. 1 to FIG. 3, which mainly includes a key cap 1, a pin 7, a main housing 5, an electronic key 9, a lower housing cover 11, and an optical tracking chip 6. The main housing 5 and the lower housing cover 11 are made of plastic, the main housing 5 is a hollow cavity, in which the pin 7 is accommodated, the pin 7 extends from an upper end of the main housing 5 and is fixedly connected to a pin seat 701 on a lower end of the pin 7 with the key cap 1, so that the pin 7 cannot be directly pulled out of the main housing 5 upwards, and a lower end of the main housing 5 is connected to the lower housing cover 11 to achieve closure. The electronic key is fixedly installed at the lower end of the inside of the main housing 5, specifically fixedly installed on the lower housing cover 11, and a trigger end of the electronic key is arranged towards the pin 7, so that a user presses the key cap 1 for enough stroke, and the pin 7 triggers the electronic key 9 by contact. The optical tracking chip 6 is arranged inside the main housing 5 and towards a side surface of the pin 7, emits a detection laser to the pin 7 of the key, and receives light reflected by the side surface of the pin 7 when the detection light is irradiated to the pin 7 of the key. When the pin 7 moves up and down or rotates, the optical tracking chip 6 receives the reflected light from the side surface of the pin 7, analyzes the current motion parameters of the pin 7 and gives an electrical signal.

More specifically, a PCB 8 is also provided in the application, arranged inside the main housing 5, and vertically positioned between an inner side wall of the main housing 5 and the pin 7. The optical tracking chip 6 is arranged on the PCB 8. Both the optical tracking chip 6 and the electronic key 9 are powered by the PCB 8 and transmit electrical signals with the PCB 8. A lower part of the PCB 8 extends below the lower housing cover 11 and exposes contacts 801. The contacts 801 are configured to connect external power supply elements.

In consideration of the overall waterproof performance of the key module, in the application, a waterproof ring cover 3 covers an upper part of the main housing 5, a first waterproof ring 4 is arranged between the waterproof ring cover 3 and the upper part of the main housing 5, and the pin 7 passes through the first waterproof ring 4 and the waterproof ring cover 3 and is connected to the key cap 1. The first waterproof ring 4 has elasticity, with an inner side tightly attached to the pin 7 and an outer side tightly attached to the main housing 5 and/or the waterproof ring cover 3. In the application, a gap at a connection between the lower housing cover 11 and the main housing 5 is filled with waterproof glue 12, or the lower housing cover 11 and the main housing 5 are directly connected by ultrasonic welding, so as to ensure a tight connection between the lower housing cover 11 and the main housing 5. Because the PCB passes through the lower housing cover 11, a contact gap between the PCB and the housing 11 is also filled with the waterproof glue 12. In addition, considering that the key module of the application is installed at a junction of an inner side and an outer side of an electrical appliance, in order to avoid external contaminants from entering the inside of the appliance, a second waterproof ring 10 is also arranged around the lower end of the main housing 5.

For ease of use, a spring 2 is fixedly connected between the upper end of the main housing 5 and a back side of the key cap, which achieves an automatic reset function of the key cap 1.

When the multi-functional key module of the application is in use, if a user lightly presses the key cap, that is, the pressed stroke is not enough to trigger the electronic key by contact, the longitudinal motion of the pin is recognized by the optical tracking chip, and the control electrical signal is given. If the user rotates the key cap, the rotation of the pin is also recognized by the optical tracking chip, and the control electrical signal is given. If the user firmly presses the key cap, that is, the pressed stroke is enough to trigger the electronic key by contact, the electronic key gives the control electrical signal. Thus, the multi-functional key module of the application achieves the multi-functional composite control effect of a single key.

The above embodiments are merely illustrative of implementation modes of the application with specific and detailed description, and are not to be construed as limiting the patent scope of the application. It is to be noted that a number of variations and modifications may be made by those of ordinary skill in the art without departing from the conception of the application, and all fall within the scope of protection of the application. Therefore, the scope of protection of the application should be determined by the appended claims.

What is claimed is:

1. A multi-functional key module, configured to be installed in an electrical appliance, comprising a hollow main housing, a pin that passes through an upper end of the main housing from the inside of the main housing upwards, an electronic key fixedly installed at the bottom of the inside of the main housing, and an optical tracking chip arranged inside the main housing and towards a side surface of the pin; wherein an upper end of the pin is fixedly connected to a key cap;

a contact trigger end of the electronic key is arranged towards the pin, and the electronic key gives an electrical signal when triggered by contact;

the optical tracking chip emits a detection laser to the side surface of the pin and receives reflected light from the side surface of the pin, and the optical tracking chip determines a motion state of the pin according to the reflected light and generates an electrical signal; and the electronic key and the optical tracking chip are electrically connected, wherein a lower end of the pin has a pin seat that prevents the pin from being completely pulled out from the upper end of the main housing.

2. The multi-functional key module according to claim 1, wherein a waterproof ring cover covers an upper part of the main housing, a first waterproof ring is arranged between the waterproof ring cover and the upper part of the main housing, and the pin passes through the waterproof ring cover and the first waterproof ring and is connected to the key cap; and the first waterproof ring has elasticity, an inner side of the first waterproof ring is tightly attached to the pin, and an outer side of the first waterproof ring is tightly attached to the main housing and/or the waterproof ring cover.

3. The multi-functional key module according to claim 1, wherein a Printed Circuit Board (PCB) is vertically arranged inside the main housing, and the PCB is located between an inner side wall of the main housing and the pin;

the optical tracking chip is arranged on the PCB; and both the optical tracking chip and the electronic key are powered by the PCB, and both the optical tracking chip and the electronic key transmit electrical signals with the PCB.

4. The multi-functional key module according to claim 3, further comprising a lower housing cover, wherein a lower end of the main housing is connected to the lower housing cover to achieve closure; and the electronic key is installed on the lower housing cover.

5. The multi-functional key module according to claim 4, wherein a gap at a connection between the main housing and the lower housing cover is filled with waterproof glue.

6. The multi-functional key module according to claim 4, wherein the main housing and the lower housing cover are both made of plastic; and a welding portion formed by ultrasonic welding is formed between the main housing and the lower housing cover.

7. The multi-functional key module according to claim 4, wherein a lower end of the PCB passes through the lower housing cover downwards, contacts are arranged on the part where the lower end of the PCB passes through the lower housing cover downwards, and the contacts are configured to connect external power supply elements.

8. The multi-functional key module according to claim 7, wherein a contact gap between the PCB and the lower housing cover is filled with the waterproof glue.

9. The multi-functional key module according to claim 1, wherein a spring is fixedly connected between the upper end of the main housing and a lower end of the key cap.

* * * * *